US012639899B2

(12) United States Patent
Nagata

(10) Patent No.: US 12,639,899 B2
(45) Date of Patent: May 26, 2026

(54) METHODS, SYSTEMS, AND DEVICES FOR PROVIDING A VIRTUAL RAMP PREVIEW TO A DRIVER OF A VEHICLE

(71) Applicant: Toyota Motor Engineering & Manufacturing North America, Inc., Plano, TX (US)

(72) Inventor: Katsumi Nagata, Foster City, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 106 days.

(21) Appl. No.: 18/630,463

(22) Filed: Apr. 9, 2024

(65) Prior Publication Data

US 2025/0316030 A1     Oct. 9, 2025

(51) Int. Cl.
  *G06T 11/60*       (2026.01)
  *G06T 3/4038*      (2024.01)
  *G06T 19/00*       (2011.01)
  *G06V 20/56*       (2022.01)

(52) U.S. Cl.
  CPC .......... *G06T 19/006* (2013.01); *G06T 3/4038* (2013.01); *G06T 11/60* (2013.01); *G06V 20/56* (2022.01)

(58) Field of Classification Search
  CPC ....... G06T 11/60; G06T 3/4038; G06V 20/56; B60R 1/20; B60R 1/22; B60R 1/27; B60R 1/28; B60P 1/43
  See application file for complete search history.

(56) References Cited

U.S. PATENT DOCUMENTS

| | | |
|---|---|---|
| 11,468,646 B1 | 10/2022 | Tay et al. |
| 2016/0098836 A1 | 4/2016 | Yamato et al. |
| 2023/0286439 A1 | 9/2023 | Gali et al. |

FOREIGN PATENT DOCUMENTS

| | | | | |
|---|---|---|---|---|
| BR | 102013006317 A2 * | 6/2015 | ............... | B60R 1/26 |
| CN | 103065519 A | 4/2013 | | |
| CN | 103076007 A | 5/2013 | | |
| CN | 105118054 A | 12/2015 | | |
| CN | 105975592 A | 9/2016 | | |
| CN | 106027792 A | 10/2016 | | |
| CN | 106559646 A | 4/2017 | | |
| CN | 212909811 U | 4/2021 | | |
| CN | 113561897 A | 10/2021 | | |

(Continued)

*Primary Examiner* — Chante E Harrison
(74) *Attorney, Agent, or Firm* — Snell & Wilmer LLP

(57)          ABSTRACT

Methods, systems, and devices for a virtual ramp preview system for a vehicle. The system may include a deployable ramp that may deploy from the vehicle. The system may further include one or more cameras that may provide one or more fields of view of a surrounding area of the vehicle. The system may further include an electronic control unit (ECU) electrically connected to the one or more cameras and a user interface. The ECU may display, via the user interface, a composite image of the one or more fields of view and a virtual vehicle that is a virtual representation of the vehicle. The ECU may augment the composite image to include a virtual ramp extending from the virtual vehicle to assist a driver of the vehicle with determining an amount of space that is required to deploy the deployable ramp.

18 Claims, 7 Drawing Sheets

(56)          References Cited

FOREIGN PATENT DOCUMENTS

| | | | | | |
|---|---|---|---|---|---|
| CN | 112793564 | A | | 7/2022 | |
| DE | 102019100717 | A1 | * | 7/2019 | ............... B60R 1/00 |
| DE | 102024113371 | A1 | * | 12/2024 | ............. B60K 35/22 |
| JP | 2017157093 | A | | 9/2017 | |
| SE | 543087 | C2 | * | 10/2020 | ........... G01S 13/937 |

* cited by examiner

METHODS, SYSTEMS, AND DEVICES FOR PROVIDING A VIRTUAL RAMP PREVIEW TO A DRIVER OF A VEHICLE

BACKGROUND

1. Field

The present disclosure relates to methods, systems, and/or devices for providing a virtual ramp preview to a driver of a vehicle.

2. Description of the Related Art

Various vehicles (e.g., vans or minivans) may be equipped with a deployable ramp that deploys from a side or a back of a vehicle to assist passengers (e.g., a person using a wheelchair) with entering or exiting the vehicle. Currently, a driver of such a vehicle must check manually to ensure there is sufficient space for deploying the ramp when looking for a place to park the vehicle. Parking spaces or locations may have obstacles and/or objects (e.g., a curb, a pile of snow, a pole, a puddle, an uneven surface, etc.) that interferes with the ability of the ramp to extend outward from the vehicle and with a passenger's ability to ascend or descend the ramp safely.

Accordingly, it is desirable to provide methods, systems, and devices for providing a virtual ramp preview to a driver of a vehicle.

SUMMARY

In general, one aspect of the subject matter described in this disclosure may be embodied in a virtual ramp preview system for a vehicle. The virtual ramp preview system may include a deployable ramp. The deployable ramp may deploy from the vehicle. The virtual ramp preview system may further include one or more cameras coupled to an exterior of the vehicle. The one or more cameras may provide one or more fields of view of a surrounding area of the vehicle. The virtual ramp preview system may further include a user interface located within the vehicle and having a display. The virtual ramp preview system may further include an electronic control unit (ECU) electrically connected to the one or more cameras and the user interface. The ECU may display, via the user interface, a composite image of the one or more fields of view. The composite image may include a virtual vehicle that is a virtual representation of the vehicle. The ECU may augment the composite image to include a virtual ramp extending from the virtual vehicle to assist a driver of the vehicle with determining an amount of space that is required to deploy the deployable ramp.

In one aspect, the subject matter may be embodied in a virtual ramp preview system for a vehicle having a deployable wheelchair ramp. The virtual ramp preview system may include one or more cameras located on an exterior of the vehicle. The one or more cameras may provide real-time video data including one or more fields of view of a surrounding area of the vehicle. The virtual ramp preview system may further include a user interface located within the vehicle and having a display. The virtual ramp preview system may further include an electronic control unit (ECU) electrically connected to the one or more cameras and the user interface. The ECU may generate a composite image of the surrounding area of the vehicle based on the one or more fields of view included in the real-time video data. The ECU may further augment the composite image to include a virtual ramp extending from a virtual vehicle, the virtual vehicle being a virtual representation of the vehicle. The ECU may further display, via the user interface, the augmented composite image.

In one aspect, the subject matter may be embodied in a method for providing a virtual ramp preview to a driver of a vehicle having a deployable wheelchair ramp. The method may include generating, via an electronic control unit (ECU), one or more composite images of a surrounding area of the vehicle based on video data from one or more cameras. The method may further include displaying, via a user interface coupled to the ECU, a composite image of the one or more composite images. The method may further include augmenting, via the ECU, the displayed composite image to include a virtual ramp to assist a driver with estimating an amount of space that is required to deploy the deployable wheelchair ramp.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure. In the drawings, like reference numerals designate like parts throughout the different views.

DETAILED DESCRIPTION

Figure 1:
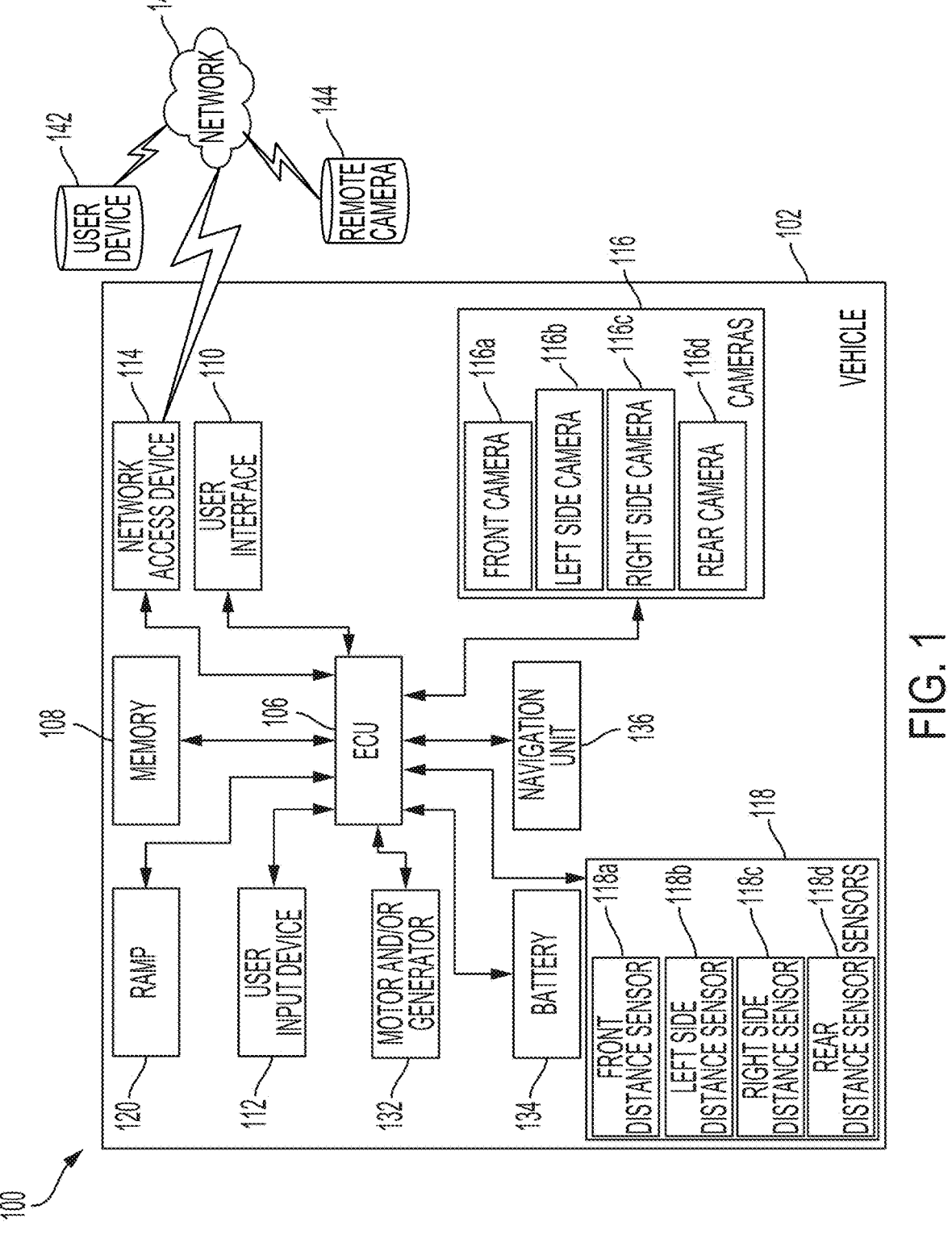
FIG. 1 is a block diagram of an example ramp (or virtual ramp) preview system for a vehicle according to an aspect of the disclosure.

Disclosed herein are methods, systems, devices, and/or vehicles for implementing a virtual ramp display and preview system. When a driver is in a vehicle that has a deployable (e.g., handicap) ramp, the driver may need assistance with determining how and where the ramp will be deployed and if there are any obstacles or safety concerns in the way of the ramp. This advantageously assists the driver and/or passengers to determine the proper place for the vehicle to be parked or stopped so the ramp can be properly and safely deployed and to avoid having to repeatedly move and/or reposition the vehicle. The virtual ramp preview system allows for an augmented real-time composite image of a surrounding area of the vehicle that is displayed on a user interface (e.g., a mobile device, a head unit or a display screen) of the vehicle with a virtual (i.e., computer graphics or actual photo or digital overlay) rendering of a ramp (e.g., a deployed wheelchair ramp of the vehicle). The real-time composite image may be of a viewpoint selected from one or more viewpoints. The virtual ramp preview system may generate the one or more viewpoints by combining one or more fields of view of the surrounding area captured by one or more cameras of the vehicle (e.g., a one, two, four, and/or six camera based panoramic view monitor (PVM) system of the vehicle). The virtual ramp may provide a visual of the ramp deployed and/or a visual estimation of the amount of space that is required to deploy the ramp of the vehicle by showing a virtual representation of the ramp in a deployed state (i.e., extending out from the vehicle), with the virtual ramp accurately depicting the length and location of the ramp in the deployed state (i.e., the virtual ramp is displayed as extending out from a location on the vehicle that corresponds to where the ramp would extend out of if deployed). This advantageously allows the driver and/or passengers to properly park or stop the vehicle so the ramp can be safely and properly deployed in the correct location. Particular embodiments of the subject matter described in this disclosure may be implemented to realize one or more of the following advantages.

The virtual ramp preview system may allow a driver to assess whether there is sufficient space and acceptable and safe conditions (e.g., absence of bumps, obstacles, puddles, uneven surfaces, etc.) to deploy the ramp and/or for a wheelchair user to use the ramp at a particular location. The driver may make the assessment without having to physically deploy the ramp or step outside the vehicle to look at the surrounding conditions.

Moreover, the virtual ramp display and preview system may combine the one or more fields of view captured by the one or more cameras into the one or more viewpoints to assist the driver in finding an acceptable area to park or stop and deploy the ramp, with the driver having the ability to select which viewpoint is displayed by the user interface of the vehicle. For example, the virtual ramp preview system may provide a panoramic bird's eye viewpoint of the vehicle and the surrounding area of the vehicle and/or a viewpoint from a side of the vehicle having the ramp. The virtual ramp preview system may also provide a virtual three-dimensional (3D) perspective viewpoint of the side of the vehicle having the ramp. For example, the virtual 3D perspective viewpoint may be a virtual rendering of a rear or front of the vehicle as seen from a viewpoint that is 1-25 feet behind or in front of the vehicle and/or 1-10 feet to the side of the vehicle.

Moreover, the virtual ramp preview system may use the one or more cameras and monocular depth estimation and/or may include one or more distance sensors to provide one or more height overlays, one or more distance overlays, and/or one or more warning overlays on the real-time composite image to further assist the driver. For example, the virtual ramp preview system may determine a height of one or more objects within the surrounding area of the vehicle, a distance from a bottom of the virtual ramp to the one or more objects, and/or a distance between the vehicle and the one or more objects. The virtual ramp preview system may then augment the real-time composite image to display the one or more height overlays corresponding to the height of the one or more objects and/or the one or more distance overlays corresponding to the distance between the vehicle and the one or more objects. The virtual ramp preview system may further augment the real-time composite image to display the one or more warning overlays when the virtual ramp preview system determines that the ramp would contact the one or more objects if deployed and/or if the ground underneath the virtual ramp is uneven due to the presence of an object and/or a hole.

FIG. 1 is a block diagram for an example ramp preview system 100 (also can be referred to as a virtual ramp preview system 100). The ramp preview system 100 or a portion thereof may be retrofitted, coupled to, include, or be included within a vehicle 102 or separate from the vehicle 102. The vehicle 102 may be a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor, an engine, and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The ramp preview system 100 and/or the vehicle 102 may include a motor and/or generator 132 and a battery 134. The motor and/or generator 132 may be located within an engine bay of the vehicle 102. The motor and/or generator 132 may be an internal combustion engine (ICE). In this regard, the motor and/or generator 132 may combust an air and fuel mixture to provide power to the vehicle 102 and/or components of the vehicle 102 and/or the ramp preview system 100. Accordingly, the motor and/or generator 132 can cause the vehicle 102 to accelerate, decelerate, or maintain a desired velocity. It should be understood that the motor and/or generator 132 may include combinations of an ICE and an electric motor, such as for hybrid vehicle applications for example. In examples, the motor and/or generator 132 may be an electric motor. In this regard, the motor and/or generator 132 may be an electric motor and an electric generator that converts electrical energy into mechanical power, such as torque, and converts mechanical power into electrical energy. The motor and/or generator 132 may be electrically connected to the battery 134. The motor and/or generator 132 may convert energy from the battery 134 into mechanical power, and may provide energy back to the battery 134, for example, via regenerative braking. The battery 134 may be electrically connected to the motor and/or generator 132 and may provide electrical energy to and/or receive electrical energy from the motor and/or generator 132. The battery 134 may provide electrical energy to the ramp preview system 100.

Figure 2:
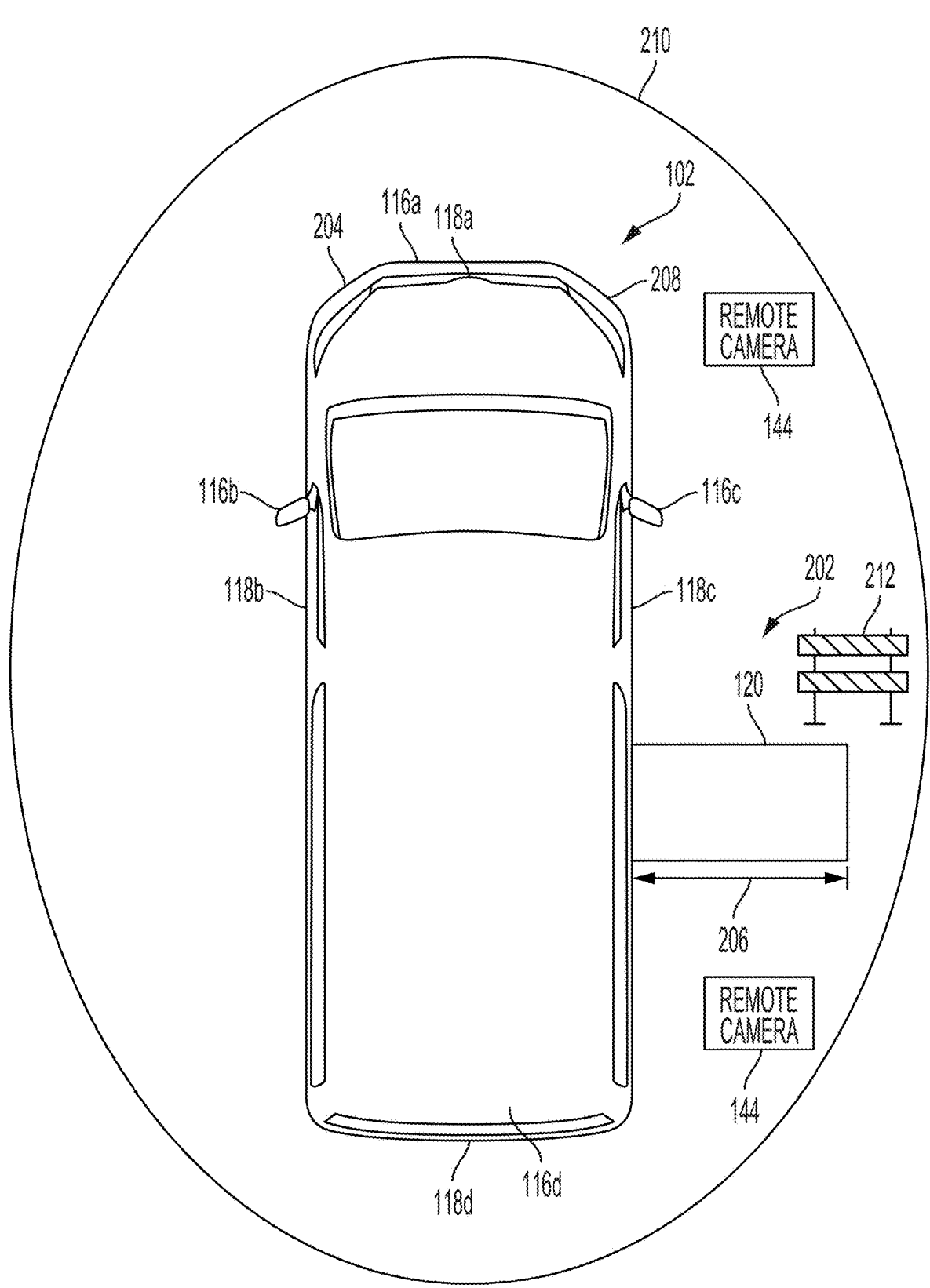
FIG. 2 is a schematic top view of a vehicle including the example ramp preview system of FIG. 1 according to an aspect of the disclosure.

FIG. 2 is an illustration of an example vehicle 102 including the example ramp preview system 100 of FIG. 1. With combined reference to FIGS. 1-2, the ramp preview system 100 may further include a ramp 120 coupled to the vehicle 102 and/or a floor of the vehicle 102. The ramp 120 may be a deployable ramp and/or a deployable wheelchair ramp and may have a deployed (or extended) state (or position) 202 and a retracted (or stowed) state (or position). The ramp 120 may be a side entry ramp (i.e., the ramp 120 is located on and deployable from a left side or a right side of the vehicle 102) and/or a rear entry ramp (i.e., the ramp 120 is located on and deployable from a rear of the vehicle 102). The ramp 120 may be configured to deploy from the vehicle 102 thereby extending outwardly from the right side, the left side, and/or the rear of the vehicle 102 to form a ramp and/or a bridge between a cabin of the vehicle 102 and the ground outside of the vehicle 102. In examples, the ramp 120 may be an infloor (or slide out) ramp (i.e., the ramp 120 deploys from and retracts into the floor of the vehicle 102 such that when in the retracted state, the ramp 120 is located and/or stowed within the floor of the vehicle 102). In examples, the ramp 120 may be a foldout ramp (i.e., the ramp 120 deploys from and retracts onto the floor of the vehicle 102 such that when in the retracted state, the ramp 120 is located and/or stowed atop the floor of the vehicle 102). The ramp 120 may extend to the deployed state 202 by unfolding and/or sliding out from the vehicle 102 manually and/or automatically. The ramp 120 may extend out a predetermined distance 206 from the vehicle 102. The predetermined distance 206 may be based on a length of the ramp 120. In examples, the ramp 120 may extend out at a variable distance from the vehicle 102 based on settings set by the driver of the vehicle 102.

The ramp preview system 100 may further include one or more cameras 116. The one or more cameras 116 may be coupled to an exterior 208 of the vehicle 102 and/or an interior of the vehicle 102 such that the one or more cameras 116 look out toward a surrounding area 210 of the vehicle 102. The one or more cameras 116 may include a front camera 116a, a left side camera 116b, a right side camera 116c, and/or a rear camera 116d. The one or more cameras 116 may be an analog camera, a digital camera, an infrared thermal camera, and/or a night vision camera (e.g., utilizing active illumination and/or image intensification). The one or more cameras 116 may provide, capture, and/or record images and/or real-time video of the surrounding area 210 of the vehicle 102. The one or more cameras 116 may also have pattern recognition capabilities to view the surrounding area 201 and identify people and/or obstacles such as bumps, curbs, puddles, uneven surfaces, potholes, etc. to avoid as a possible location for the ramp deployment and to identify safe and good locations for deployment of the ramp. The image of the ramp may be displayed in red when the deployment location is not ideal and in green when the deployment location is ideal.

The surrounding area 210 may be a portion of a surrounding environment of the vehicle 102 that is visible to the one or more cameras 116 and/or displayed to the driver (e.g., via a user interface 110 of the vehicle 102). Each camera of the one or more cameras 116 may cover a field of view of one or more fields of view. The one or more fields of view may correspond to a panoramic (i.e., 360-degree) view around the vehicle 102 when the one or more fields of view are combined to form one or more viewpoints. In examples, the one or more fields of view may correspond to a less than 360-degree view (e.g., a 180-degree view) when the one or more fields of view are combined to form the one or more viewpoints.

The front camera 116a may be coupled to the exterior 208 and/or a front bumper 204 of the vehicle 102. In examples, the ramp preview system 100 may include a plurality of front cameras each having a different field of view and/or orientation. The front camera 116a may provide, capture, and/or record real-time video of a front field of view (e.g., capturing a portion of the surrounding area 210 of the vehicle 102 that is in front of the vehicle 102).

The left side camera 116b may be coupled to the exterior 208 and/or a left side of the vehicle 102 (e.g., a left side mirror, a left side quarter panel, a left side door, etc.). In examples, the ramp preview system 100 may include a plurality of left side cameras each having a different field of view and/or orientation. The left side camera 116b may provide, capture, and/or record real-time video of a left field of view (e.g., capturing a portion of the surrounding area 210 of the vehicle 102 that is to the left of the vehicle 102).

The right side camera 116c may be coupled to the exterior 208 and/or a right side of the vehicle 102 (e.g., a right side mirror, a right side quarter panel, a right side door, etc.). In examples, the ramp preview system 100 may include a plurality of right side cameras each having a different field of view and/or orientation. The right side camera 116c may provide, capture, and/or record real-time video of a right field of view (e.g., capturing a portion of the surrounding area 210 of the vehicle 102 that is to the right of the vehicle 102).

The rear camera 116d may be coupled to the exterior 208, a rear bumper, a tailgate, and/or a liftgate of the vehicle 102. In examples, the ramp preview system 100 may include a plurality of rear cameras each having a different field of view and/or orientation. The rear camera 116d may provide, capture, and/or record real-time video of a rear field of view (e.g., capturing a portion of the surrounding area 210 of the vehicle 102 that is to the rear of the vehicle 102).

The ramp preview system 100 may further include one or more sensors (or one or more distance sensors) 118. The one or more sensors 118 may be a camera, a radar sensor, a sonar sensor, a lidar sensor, and/or another distance measuring sensor. The one or more sensors 118 may measure, detect, and/or determine spatial information of one or more objects 212 in the surrounding area 210 of the vehicle 102 by periodically and/or constantly scanning (or monitoring) the surrounding area 210 and constructing a point cloud. The spatial information may include a width, a height, and/or a depth of the one or more objects 212 and a position and/or location of the one or more objects 212 relative to the vehicle 102. The one or more objects 212 may include the ground outside of the vehicle 102, a curb, a sidewalk, a railing, a pole, a tree, a wall, a pile of snow, and/or any other stationary object. The one or more sensors 118 may include a front distance sensor 118a, a left side distance sensor 118b, a right side distance sensor 118c, and/or a rear distance sensor 118d. In examples, the one or more objects 212 may include one or more forward objects, one or more left side objects, one or more right side objects, and/or one or more rear objects. In examples where the one or more sensors 118 include a camera, the one or more sensors 118 may be the same as the one or more cameras 116 or may be in addition to the one or more cameras 116. The ramp preview system 100 may use monocular and/or binocular depth estimation to determine the spatial information of the one or more objects 212 when the one or more sensors 118 include one or more cameras.

The front distance sensor 118a may be coupled to the exterior 208 and/or the front bumper 204 of the vehicle 102. The front distance sensor 118a may measure, detect, and/or determine spatial information of the one or more forward objects in the surrounding area 210 of the vehicle 102 that are in front of the vehicle 102. In examples, the ramp preview system 100 may include a plurality of front distance sensors.

The left side distance sensor 118b may be coupled to the exterior 208 and/or the left side of the vehicle 102 (e.g., the left side mirror, the left side quarter panel, the left side door, etc.). The left side distance sensor 118b may measure, detect, and/or determine spatial information of the one or more left side objects in the surrounding area 210 of the vehicle 102 that are to the left of the vehicle 102. In examples, the ramp preview system 100 may include a plurality of left side distance sensors.

The right side distance sensor 118c may be coupled to the exterior 208 and/or the right side of the vehicle 102 (e.g., the right side mirror, the right side quarter panel, the right side door, etc.). The right side distance sensor 118c may measure, detect, and/or determine spatial information of the one or more right side objects in the surrounding area 210 of the vehicle 102 that are to the right of the vehicle 102. In examples, the ramp preview system 100 may include a plurality of right side distance sensors.

The rear distance sensor 118d may be coupled to the exterior 208 and/or the rear bumper of the vehicle 102. The rear distance sensor 118d may measure, detect, and/or determine spatial information of the one or more rear objects in the surrounding area 210 of the vehicle 102 that are to the rear of the vehicle 102. In examples, the ramp preview system 100 may include a plurality of rear distance sensors.

The ramp preview system 100 may further include one or more processors, such as an electronic control unit (ECU) 106. The ECU 106 may be implemented as a single ECU or in multiple ECUs. The ECU 106 may be electrically connected to some or all of the components of the vehicle 102 and/or the ramp preview system 100. The ECU 106 may be electrically connected to the ramp 120, the one or more cameras 116, the one or more sensors 118, a memory 108, a user interface 110, a network access device 114, a navigation unit 136, and/or a user input device 112. The ECU 106 may include one or more processors (or controllers) specifically designed for controlling operations of the vehicle 102, such as accelerating, braking, controlling the ramp 120 to deploy and/or retract, controlling a panoramic view monitor (PVM) of the vehicle 102 (e.g., the one or more cameras 116), etc.

The ramp preview system 100 may further include the memory 108. The memory 108 may be electrically connected to the ECU 106. In examples, the memory 108 may be communicatively coupled (e.g., via network 140) to the ECU 106 such that the memory 108 is remote from the ECU 106 and/or the vehicle 102. In other examples, the memory 108 may be electrically connected to the ECU 106 and a remote memory (e.g., a remote database) may be communicatively coupled to the ECU 106, with the remote memory having similar, additional, and/or different functions as the memory 108 (e.g., greater storage capacity, enabling over-the-air updates, etc.). The memory 108 may store instructions to execute on the ECU 106 and may include one or more of a random access memory (RAM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 106. The memory 108 may store vehicle parameters (e.g., vehicle weight, vehicle length, vehicle width, vehicle height, transmission gear information, etc.).

The memory 108 may further store ramp parameters. The ramp parameters may include physical measurements and/or attributes of the ramp 120 including a width, a length (e.g., the length that the ramp 120 extends out from the vehicle 102 when in the deployed state 202 such as the predetermined distance 206), deployment location information, and/or clearance information. The deployment location information may include measurements corresponding to a location on the vehicle 102 from where the ramp 120 deploys. For example, the deployment location information may include which side of the vehicle 102 the ramp 120 deploys from, and at what point (or area) of the vehicle 102 the ramp 120 deploys from (e.g., a point or area with respect to the length, height, and width of the vehicle 102). The clearance information may correspond to dimensions of an area between a bottom of the ramp 120 and the ground when the ramp 120 is in the deployed state 202. The clearance information may include a height between the bottom of the ramp 120 (in the deployed state 202) and the ground beneath the ramp 120 at various points along the ramp 120. The clearance information may include one or more heights because the ramp 120 may be at an angle when deployed and not parallel to the ground. The clearance information may correspond to a maximum height of an object of the one or more objects 212 that the ramp 120 may deploy over such that the object would be beneath the ramp 120 and would not obstruct that ramp 120. The ramp parameters may be determined and/or set during manufacture of the vehicle 102 and/or may be determined, set, and/or changed after the ramp 120 is manufactured and/or installed in the vehicle 102.

The ramp preview system 100 may further include the user interface 110. The user interface 110 may be located within the cabin of the vehicle 102 and/or may be coupled to the dashboard of the vehicle 102. The user interface 110 may provide an interface to a user of the vehicle 102 to interact with and/or receive output from the ECU 106. The user interface 110 may have a user interface element, such as a screen and/or a touchscreen with a button, a switch, a microphone, a speaker, a gesture monitoring sensor, a knob, a graphical user interface (GUI), and/or other input/output devices electrically connected to the ECU 106 to provide input and/or output of information (or data) to and/or from the ECU 106. The user interface 110 may include one or more displays to display a real-time composite image including one or more viewpoints of the surrounding area 210 to a driver of the vehicle 102 to assist the driver in finding an appropriate location to park and/or deploy the ramp 120 of the vehicle 102.

The ECU 106 may include one or more microcontrollers and/or image processing programs to generate and display, via the user interface 110, the real-time composite image including a viewpoint of the one or more viewpoints to the driver of the vehicle 102. To generate the one or more viewpoints, the ECU 106 may receive video signals (or video data) from the one or more cameras 116 and may process the video signals (e.g., the video signals may be fed into an image processing program of the ECU 106). For example, the ECU 106 and/or the image processing program may process the video signals by stitching together the one or more fields of view of the surrounding area 210 (e.g., the front field of view, the left field of view, the right field of view, and/or the rear field of view) included within the video signals to create the one or more viewpoints. In examples, the video signals are processed based on a user selected (e.g., via the user interface 110) viewpoint of the one or more viewpoints. For example, the one or more fields of view may be combined to provide a panoramic bird's eye viewpoint of the vehicle 102 and the surrounding area 210 with the vehicle 102 being centered and/or offset within the panoramic bird's eye viewpoint. In examples, the one or more fields of view may be combined to provide one or more 3D perspective viewpoints of the surrounding area 210. In further examples, the one or more fields of view may be combined to provide a ramp side viewpoint of the surrounding area 210. The ECU 106 may continually generate the one or more viewpoints such that the one or more viewpoints may each provide a real-time view of the surrounding area 210 as the vehicle 102 moves through the surrounding environment.

In examples, each viewpoint of the one or more viewpoints generated by the ECU 106 may include perspective transformation. Perspective transformation may provide the appearance that the one or more viewpoints, when displayed on the user interface 110, are being captured from a "camera" that is hovering above, behind, and/or to a side of the vehicle 102. In examples, a user may select (e.g., via the user interface 110) a dynamic viewpoint that enables the user to drag and/or move the "camera" to change the viewpoint being displayed. For example, the dynamic viewpoint may enable the user to freely drag and/or move (e.g., via a touchscreen and/or a touchpad of the user interface 110) a displayed viewpoint to view the surrounding area 210 from a plurality of angles. Thus, the dynamic viewpoint may enable the user to view the surrounding area 210 from other angles in addition to the panoramic bird's eye viewpoint, the one or more 3D perspective viewpoints, and/or the ramp side viewpoint. In various aspects, the ECU 106 may receive the images/viewpoints from the one or more cameras 116 and using image and pattern recognition technology, may identify and display the ramp as an image or overlay and identify and notify and/or direct the driver of a safe and acceptable location for deployment.

Figure 3:
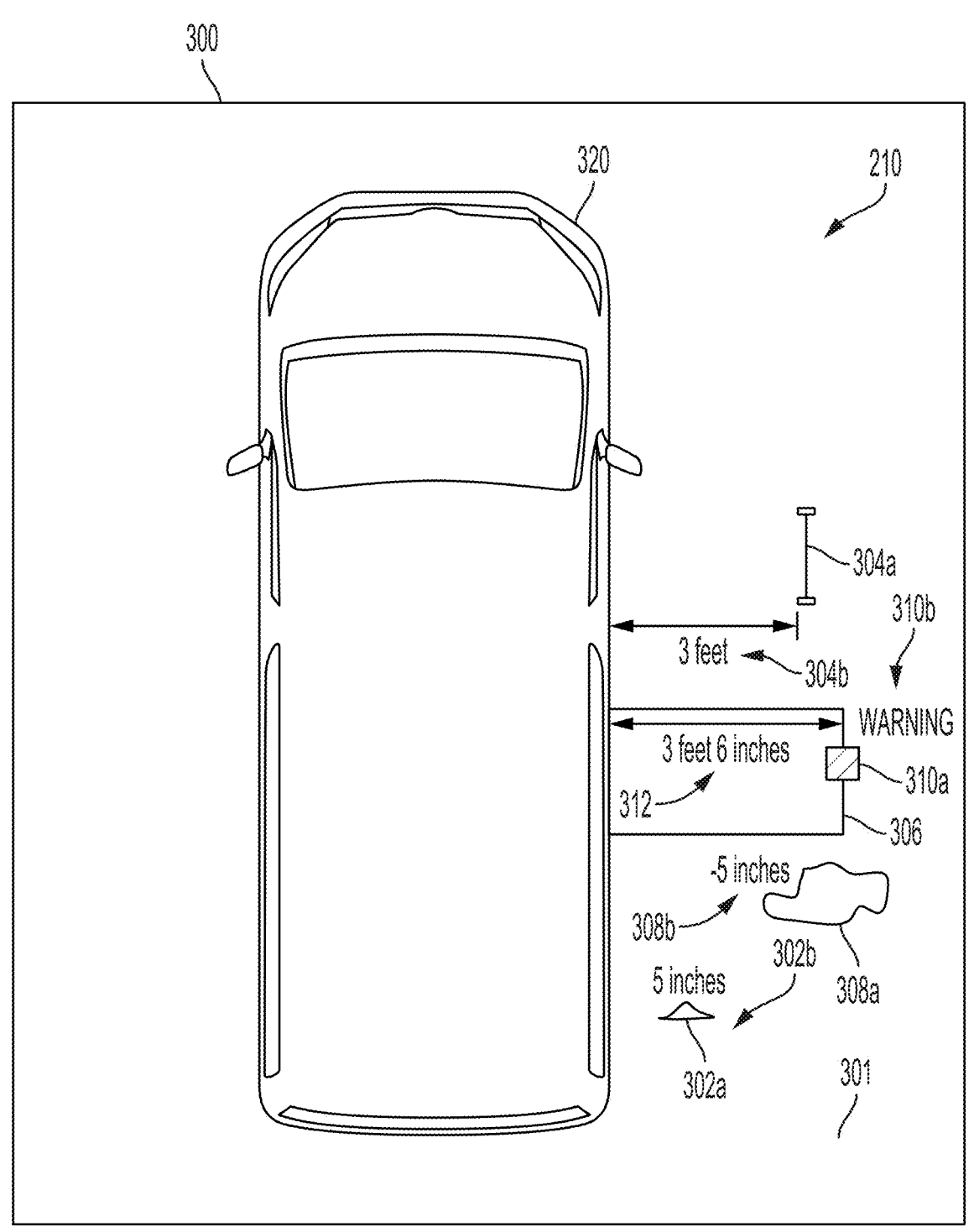
FIG. 3 is an illustration of an example panoramic bird's eye viewpoint displayed by the example ramp preview system of FIG. 1 according to an aspect of the disclosure.
Figure 4:
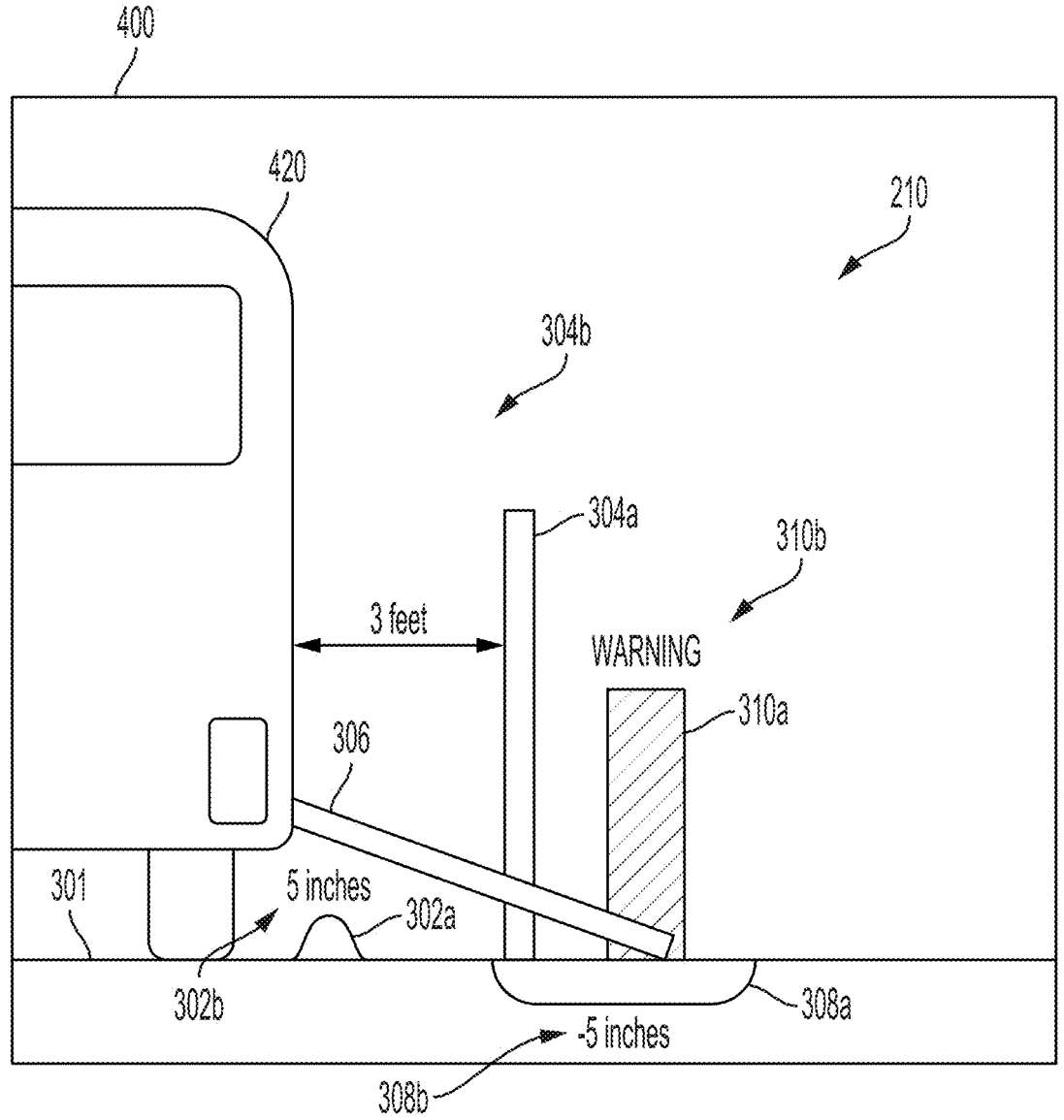
FIG. 4 is an illustration of an example rear 3D perspective viewpoint displayed by the example ramp preview system of FIG. 1 according to an aspect of the disclosure.
Figure 5:
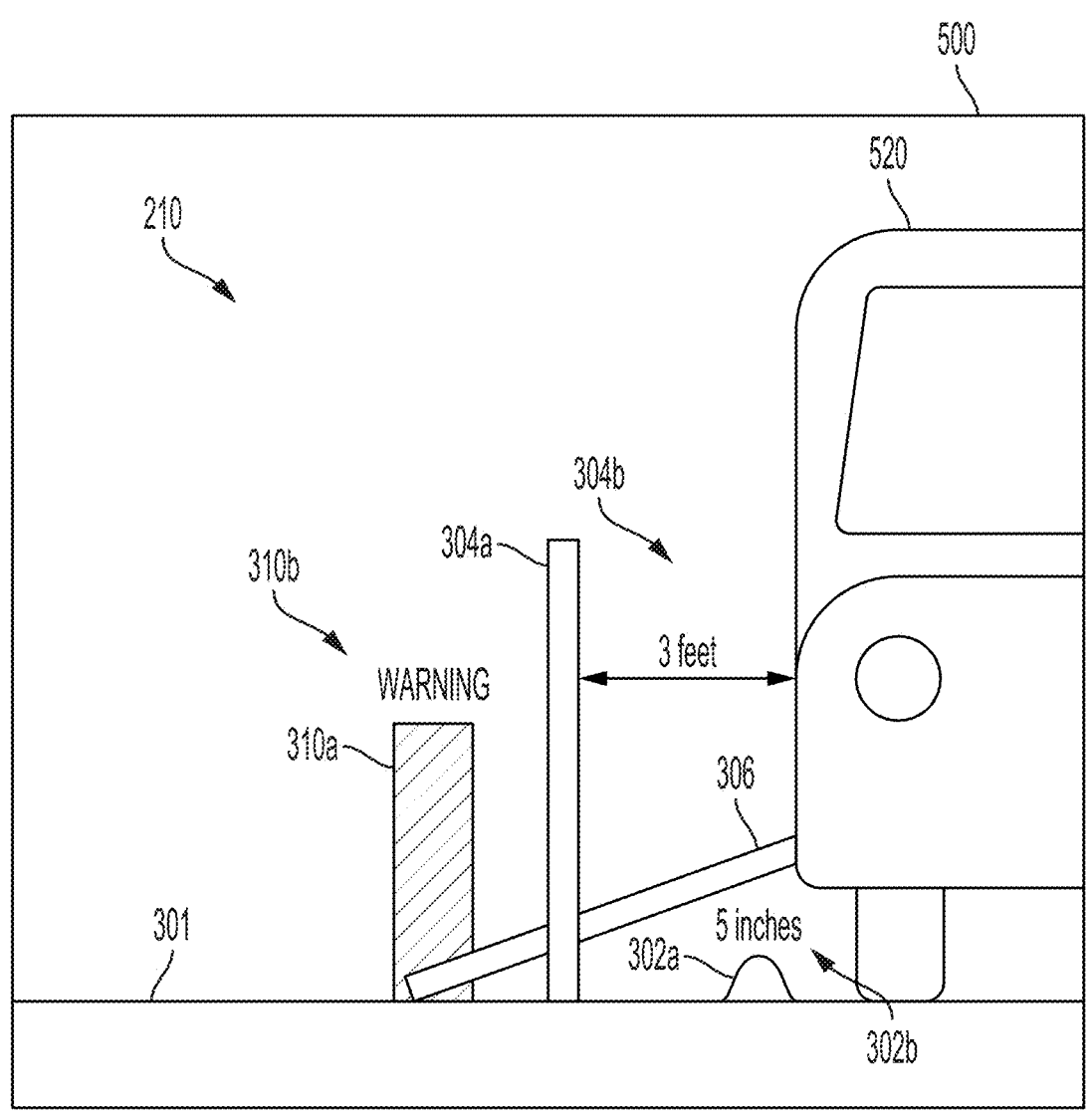
FIG. 5 is an illustration of an example front 3D perspective viewpoint displayed by the example ramp preview system of FIG. 1 according to an aspect of the disclosure.
Figure 6:
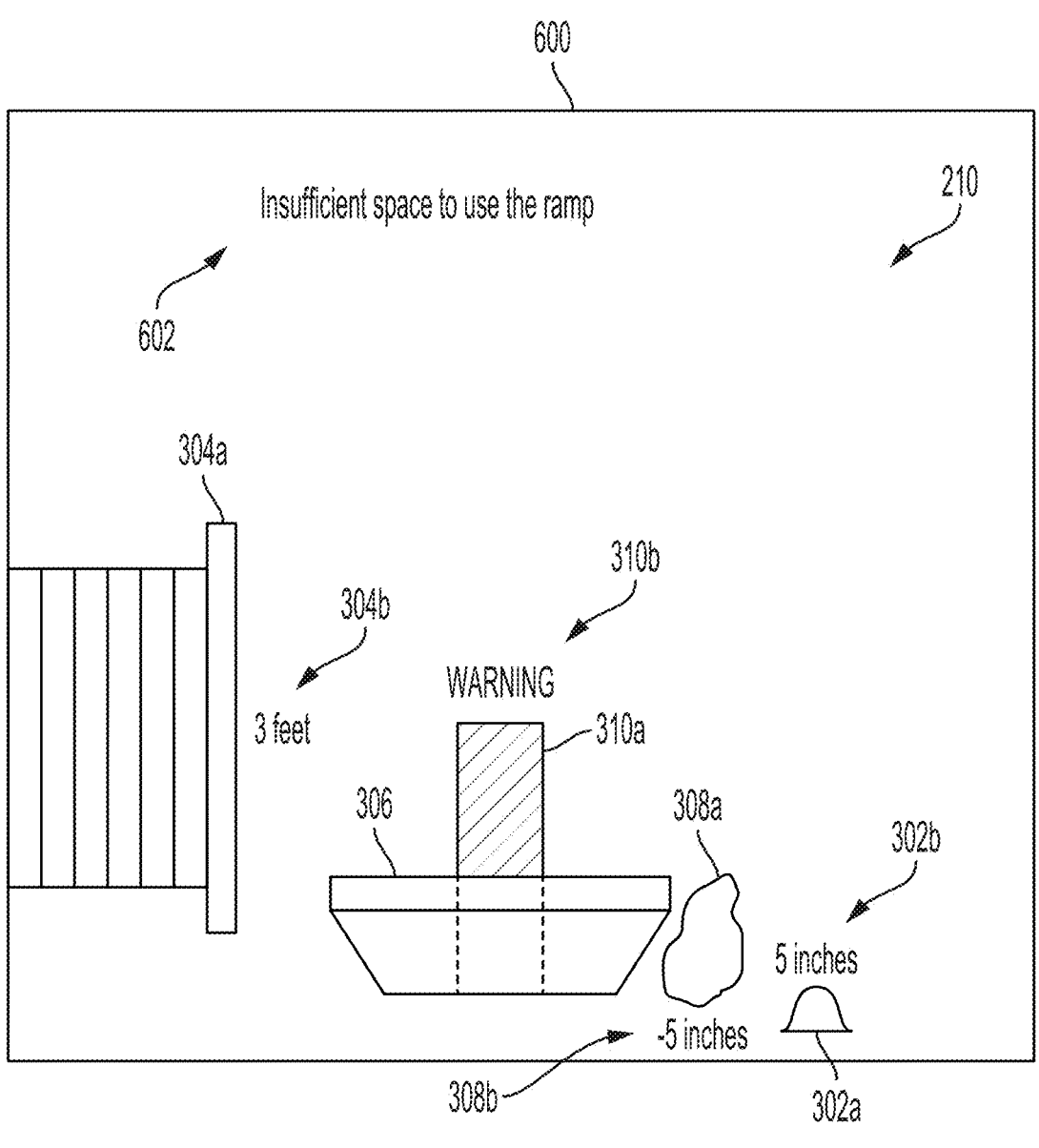
FIG. 6 is an illustration of an example ramp side viewpoint displayed by the example ramp preview system of FIG. 1 according to an aspect of the disclosure.

FIGS. 3-6 are illustrations of example composite images (or real-time composite images) 300-600 each including a viewpoint of the one or more viewpoints that may be displayed by the user interface 110. The ramp preview system 100 may display a first composite image 300 having a panoramic bird's eye viewpoint (as shown by FIG. 3). The ramp preview system 100 may further display a second composite image 400 having a rear 3D perspective viewpoint (as shown by FIG. 4). The ramp preview system 100 may further display a third composite image 500 having a front 3D perspective viewpoint (as shown by FIG. 5). The ramp preview system 100 may further display a fourth composite image 600 having a ramp side viewpoint (as shown by FIG. 6). With combined reference to FIGS. 1-6, the composite images 300-500 may each include a virtual ramp 306 extending from a virtual representation of the vehicle 102 (i.e., a virtual vehicle 320, a virtual vehicle 420, or a virtual vehicle 520, respectively) and the fourth composite image 600 may include the virtual ramp 306 extending from the viewpoint (i.e., having the appearance of extending forward and/or out from a side of a virtual vehicle) to assist the driver in finding an appropriate location to park and/or deploy the ramp 120 of the vehicle 102.

The virtual ramp 306 may be a computer graphics rendering of the ramp 120 and may be scaled based on the dimensions of the ramp 120. The virtual ramp 306 may appear in the composite images 300-500 as extending outward from the virtual vehicle 320, 420, 520 at a location on the vehicle 102 where the ramp 120 may deploy from the vehicle 102. In the fourth composite image 600, the virtual ramp 306 may appear as extending outward from the viewpoint and in some examples may appear as extending outward from a side of a virtual vehicle. The virtual ramp 306 may be positioned and/or sized according to known reference points in the surrounding area 210 and/or on the vehicle 102 such that the virtual ramp 306 accurately represents the size and location of the ramp 120 in the deployed state 202 within the composite images 300-600. The known reference points may be determined via the one or more sensors 118. The ECU 106 may use augmented reality processing techniques to overlay the virtual ramp 306 onto the real-world video of the composite images 300-600. In examples, the ECU 106 and/or the user interface 110 may generate (or render) the virtual ramp 306 from a 2D or 3D model saved in the memory 108. The virtual ramp 306 may allow the driver to visually estimate a distance between the virtual ramp 306 and one or more objects within the surrounding area 210, with the distance between the virtual ramp 306 and the one or more objects corresponding to a distance between the ramp 120 and the one or more objects if the ramp 120 were deployed. The one or more objects may be captured by the one or more cameras 116 and displayed within the composite images 300-600 and/or may be virtual representations of the one or more objects generated from data collected by the one or more cameras 116 and/or the one or more sensors 118. Combining real-world video from the one or more cameras 116 and spatial information from the one or more sensors 118 helps to ensure that the ramp preview system 100 detects and/or displays every object within the surrounding area 210.

In examples, the ECU 106 may annotate the composite images 300-600 with distance information corresponding to a distance between the vehicle 102 and/or the virtual ramp 306 and one or more objects within the surrounding area 210. The distance information may appear as an overlay (e.g., a computer graphics rendering) positioned by the one or more objects in the composite images 300-600. For example, the one or more objects within the surrounding area 210 may include a fence 304a and a pole 310a. The composite images 300-600 may include a distance annotation 304b that displays the distance between, for example, the fence 304a and the vehicle 102 (e.g., 3 feet). The distance annotation 304b may include a number and a unit of measurement (e.g., "3 feet") and/or may include a notation specifying the number relates to a distance (e.g., "3 feet away"). In examples, when the distance between the one or more objects and the vehicle 102 is less than the length of the ramp 120 (e.g., the distance between the pole 310a and the vehicle 102), the one or more objects (e.g., the pole 310a) and/or the virtual ramp 306 may be highlighted in red (represented by diagonal lines across the pole 310a in FIGS. 3-6) and/or may include a warning annotation 310b by the one or more objects to warn the driver that the ramp 120 will contact the one or more objects if the ramp 120 were deployed in the current location of the vehicle 102.

The ramp preview system 100 may determine the distance between the one or more objects and the vehicle 102 based on the spatial information received from the one or more sensors 118. The one or more sensors 118 and/or the ECU 106 may construct a point cloud of the surrounding area 210 and/or the one or more objects within the surrounding area 210 to determine the dimensions of the one or more objects and the spatial relationship of the one or more objects relative to the vehicle 102. Moreover, the ramp preview system 100 may determine whether the one or more objects would contact the ramp 120 if the ramp 120 were deployed in the current location of the vehicle 102 based on the spatial information received from the one or more sensors 118 and the ramp parameters stored in the memory 108. For example, the ECU 106 may determine that the pole 310a is X feet away from the vehicle 102 and may then compare X to a length Y of the ramp 120 in the deployed state 202. If X is equal to or less than Y, the ECU 106 may annotate the composite images 300-600 with a warning annotation 310b by the pole 310a. In examples, the ECU 106 may annotate the composite images 300-600 with the warning annotation 310b by the pole 310a if, in addition to X being equal to or less than Y, the ECU 106 further determines that the ramp 120 would contact the pole 310a based on the width of the ramp 120 and the current location of the vehicle 102 (i.e., the pole 310a is in front of a deployment location of the ramp 120). In examples, the ECU 106 may include a buffer zone that is added onto the length and/or the width of the ramp 120 to ensure that there is enough room between the ramp 120 and the one or more objects for a wheelchair user to use the ramp 120.

In examples, the ECU 106 may further annotate the composite images 300-600 with height information corresponding to a height of the one or more objects within the surrounding area 210 and/or a distance between a top of the one or more objects and the bottom of the virtual ramp 306. The height information may appear as an overlay (e.g., a computer graphics rendering) positioned by the one or more objects in the composite images 300-600. For example, the one or more objects within the surrounding area 210 may include a rock 302a and a pothole 308a. The composite images 300-600 may include a height annotation 302b that displays the height of, for example, the rock 302a relative to the ground and/or a street 301 below the rock 302a (e.g., 5 inches). The height annotation 302b may include a number and a unit of measurement (e.g., "5 inches") and/or may include a notation specifying the number relates to a height (e.g., "5 inches tall"). The composite images 300-600 may further include a depth annotation 308b that displays a depth of, for example, the pothole 308a relative to the ground and/or the street 301 (e.g., −5 inches). In examples, when the height of an object of the one or more objects is too great for the ramp 120 to deploy over the object, the object and/or the virtual ramp 306 may be highlighted in red and/or may include a warning annotation 310b by the object to warn the driver that the ramp 120 will contact the object if the ramp 120 were to be deployed in the current location of the vehicle 102.

The ramp preview system 100 may determine the height of the one or more objects based on the spatial information received from the one or more sensors 118. Moreover, the ramp preview system 100 may determine whether the object would contact the ramp 120 if the ramp 120 were to be deployed in the current location of the vehicle 102 and over the object based on the spatial information received from the one or more sensors 118 and the ramp parameters stored in the memory 108, specifically the clearance information included in the ramp parameters. For example, the ECU 106 may determine whether the object will contact the ramp 120 if the ramp 120 were deployed over the object by comparing the height of the object to the height of a portion of the ramp 120 that would be above the object if the ramp 120 were deployed at the current location of the vehicle 102.

As shown by FIG. 3, the panoramic bird's eye viewpoint included in the first composite image 300 may appear as a top view of the vehicle 102 and the surrounding area 210. The panoramic bird's eye viewpoint may appear as a view from a viewpoint that is 1-25 feet above the vehicle 102. The first composite image 300 may include the virtual vehicle 320, the virtual vehicle 320 being a virtual representation of a top of the vehicle 102.

In examples, the ECU 106 may further annotate the composite images 300-600 with ramp information corresponding to a length and/or a width of the ramp 120 as shown by FIG. 3. The ramp information may further assist a driver with determining how much space is required to deploy the ramp 120. The ramp information may appear as an overlay (e.g., a computer graphics rendering) positioned by and/or on the virtual ramp 306 in the composite images 300-600. The composite images 300-600 may include a ramp annotation 312 that displays the length of the ramp 120 in the deployed state 202 (e.g., 3 feet 6 inches). The ramp annotation 312 may include a number and a unit of measurement (e.g., "3 feet 6 inches") and/or may include a notation specifying the number relates to a length (e.g., "3 feet 6 inches long").

As shown by FIG. 4, the rear 3D perspective viewpoint included in the second composite image 400 may appear as a rear to front view of the vehicle 102 and the surrounding area 210 at a ground level. The rear 3D perspective viewpoint may appear as a view from a viewpoint that is 1-25 feet behind and/or 1-10 feet to a side of the vehicle 102. When a hole is within the surrounding area 210, such as the pothole 308a, the second composite image 400 may include a virtual representation of the ground below the street 301 to better illustrate to the driver the depth of the hole and/or the unevenness of the street 301. The second composite image 400 may include the virtual vehicle 420, the virtual vehicle 420 being a virtual representation of the rear of the vehicle 102.

As shown by FIG. 5, the front 3D perspective viewpoint included in the third composite image 500 may appear as a front to rear view of the vehicle 102 and the surrounding area 210 at a ground level. The front 3D perspective viewpoint may appear as a view from a viewpoint that is 1-25 feet in front of and/or 1-10 feet to a side of the vehicle 102. When a hole is within the surrounding area 210 the third composite image 500 may include a virtual representation of the ground below the street 301 to better illustrate to the driver the depth of the hole and/or the unevenness of the street 301. The third composite image 500 may include the virtual vehicle 520, the virtual vehicle 520 being a virtual representation of the front of the vehicle 102.

As shown by FIG. 6, the ramp side viewpoint included in the fourth composite image 600 may appear as an outward view of the surrounding area 210 from a side of the vehicle 102 with the virtual ramp 306 extending out and being centered in the ramp side viewpoint (in examples, the virtual ramp 306 may be offset to the left or the right in the ramp side viewpoint). The ramp side viewpoint may appear as a view from a viewpoint that is on the exterior 208 of the vehicle 102 and looking outwardly from a left side or a right side of the vehicle 102. In examples, the ramp side viewpoint may be from the rear of the vehicle 102. The fourth composite image 600 may include a virtual vehicle, the virtual vehicle being a virtual representation of a ramp side of the vehicle 102.

In examples, the ECU 106 may further annotate the composite images 300-600 with parking assessment information corresponding to an assessment of a parking location (i.e., a current location of the vehicle 102) as shown by FIG. 6. In examples, the ramp preview system 100 may utilize artificial intelligence (AI) (e.g., generative AI) to provide the parking assessment information in real time. The parking assessment information may appear as an overlay (e.g., a computer graphics rendering) in the composite images 300-600 (e.g., near the top, bottom, and/or side of the composite images 300-600). For example, the composite images 300-600 may include a negative parking assessment annotation 602 that displays a message stating, for example, "Insufficient space to use the ramp" or "A better location to use the ramp is recommended." The negative parking assessment annotation 602 may be generated and included within the composite images 300-600 when the composite images 300-600 include a warning annotation (e.g., warning annotation 310b) and/or when the ramp preview system 100 determines (e.g., via the AI) a parking location is not suitable to deploy the ramp 120. The AI may be a machine learning system (or program) that is trained on a data set including measurements and/or visual data of suitable and unsuitable parking locations. The machine learning system may compare spatial information from the one or more sensors 118 and/or real-time video data from the one or more cameras 116 with the measurements and/or the visual data of the suitable and the unsuitable parking locations to determine whether a parking location is suitable. A positive parking assessment annotation may be generated when the composite images 300-600 do not include a warning annotation (e.g., warning annotation 310b) and/or when the ramp preview system 100 determines (e.g., via the AI) a parking location is suitable to deploy the ramp 120. The positive parking assessment annotation may state, for example, "This is a good location to use the ramp."

The ramp preview system 100 may further include the network access device 114. The network access device 114 may be electrically connected to the ECU 106 and may include a communication port or channel, such as one or more of a Wi-Fi unit, a Bluetooth® unit, a Radio Frequency Identification (RFID) tag or reader, a DSRC unit, and/or a cellular network unit for accessing a network 140 (e.g., CDMA, GSM, 3G, 4G, 5G, etc.). The network access device 114 may transmit data to and receive data from devices and systems not directly connected to the vehicle 102. For example, the ECU 106 may communicate with a user device 142 (e.g., a key fob, a mobile device, phone, tablet, laptop, etc.) through the network access device 114. In examples, a user (e.g., the owner of the vehicle 102) may use the user device 142 to communicate with the ECU 106 to start the vehicle 102, activate the ramp preview system 100, and/or view the composite images 300-600 of the ramp preview system 100.

In examples, the network access device 114 may enable the ECU 106 to receive additional fields of view of the surrounding area 210 from one or more remote cameras 144. The one or more remote cameras 144 may be cameras of other vehicles and/or may be other third-party cameras (e.g., security cameras, parking lot cameras, etc.) that are available to provide the additional fields of view of the surrounding area 210. In examples, the one or more remote cameras 144 may improve the one or more composite images 300-600 by providing fields of view that may not otherwise be available to the ECU 106 due to the location of the one or more cameras 116 on the vehicle 102.

The ramp preview system 100 may further include the navigation unit 136. The navigation unit 136 may be electrically connected to the ECU 106 and may provide vehicle information (or data) and/or navigational map information to the ECU 106. The navigation unit 136 may have and/or be connected to a Global Positioning System (GPS) device. The vehicle information may include a current position and/or location of the vehicle 102, a current time at the current position, a direction of travel, and/or a current speed of the vehicle 102. In examples, the ECU 106 may automatically start the ramp preview system 100 based on the vehicle information received from the navigation unit 136. For example, the ECU 106 may learn one or more locations where the ramp preview system 100 is regularly activated and may automatically activate the ramp preview system 100 when the vehicle 102 approaches and/or arrives at the one or more locations. In examples, the one or more locations may be stored in the memory 108 by a user of the vehicle 102 (e.g., via the user interface 110).

The ramp preview system 100 may further include a user input device 112. The user input device 112 may be located within the cabin of the vehicle 102 and/or may be coupled to the dashboard of the vehicle 102. The user input device 112 may be electrically connected to the ECU 106. The user input device 112 may be and/or include one or more buttons, one or more switches, one or more dials, one or more touch screens, one or more gesture control sensors, one or more voice control sensors, and/or any other input devices. The user input device 112 may receive and/or detect user input from a user to activate and/or deactivate the ramp preview system 100 (e.g., start and/or stop displaying the composite images 300-600 on the user interface 110).

Figure 7:
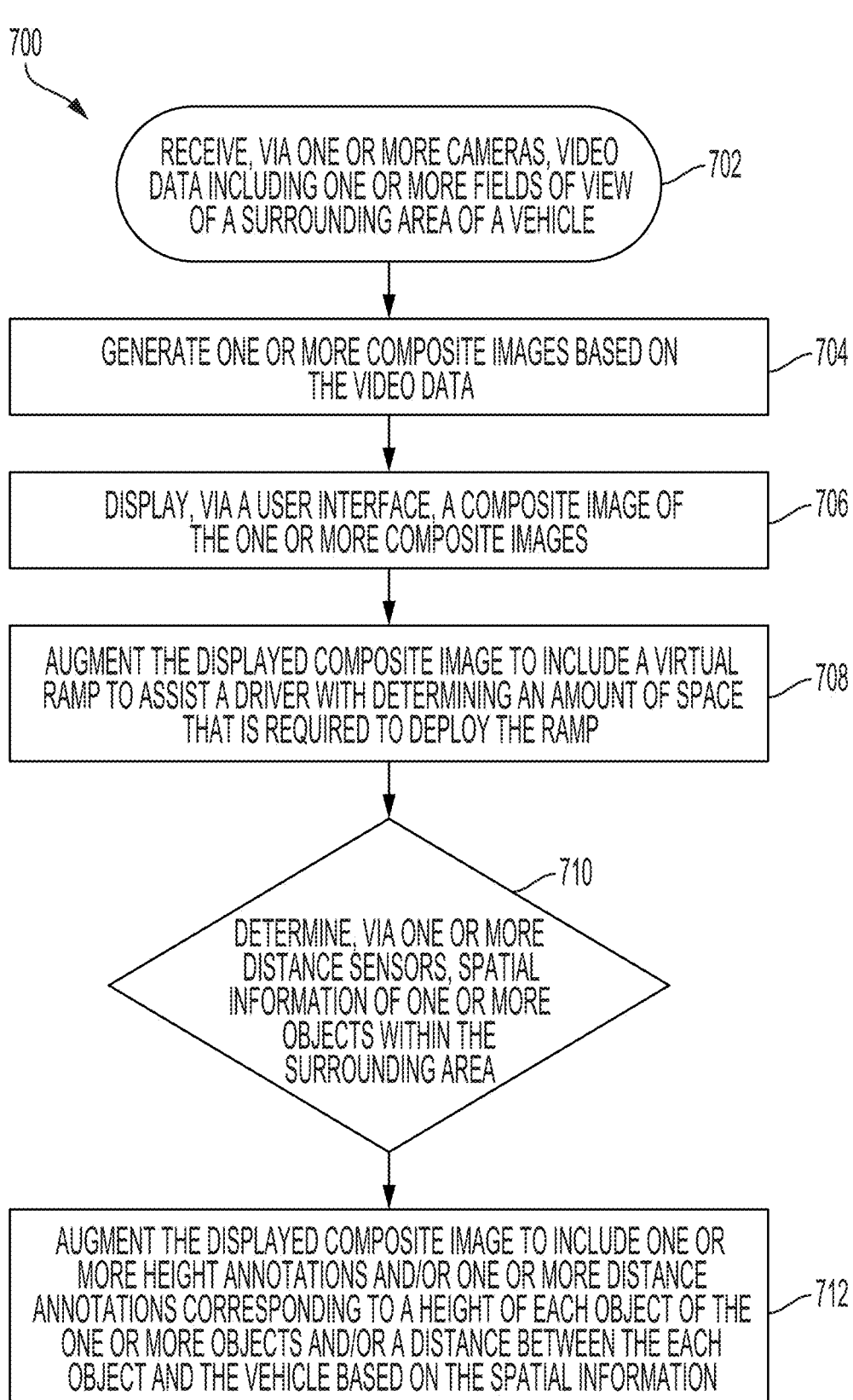
FIG. 7 is a flow diagram of an example process for controlling the ramp preview system of FIG. 1 according to an aspect of the disclosure.

FIG. 7 is a flow diagram of an example process 700 for controlling the ramp preview system 100. One or more computers or one or more data processing apparatuses, for example, the ECU 106 of the ramp preview system 100 of FIG. 1, appropriately programmed, may implement the process 700. For ease of description, the process 700 is described below with reference to FIGS. 1-6. The process 700 of the present disclosure, however, is not limited to use of the exemplary ramp preview systems of FIGS. 1-6.

The ramp preview system 100 may receive, via the one or more cameras 116, video data including the one or more fields of view of the surrounding area 210 of the vehicle 102 (702).

The ramp preview system 100 may generate one or more composite images 300-600 based on the video data (704). The one or more composite images 300-600 may include the panoramic bird's eye viewpoint, the rear 3D perspective viewpoint, the front 3D perspective viewpoint, and/or the ramp side viewpoint. To generate the one or more composite images 300-600, the ECU 106 may stitch together (or combine) the one or more fields of view included in the video data. In examples, a user may select a composite image of the one or more composite images 300-600 to be displayed on the user interface 110. The ECU 106 may stitch together the one or more fields of view based on a viewpoint included in the user selected composite image.

The ramp preview system 100 may display, via the user interface 110, a composite image of the one or more composite images 300-600 (706). The composite image may be selected by a user through the user interface 110. The displayed composite image may allow a driver to see one or more objects within the surrounding area 210 of the vehicle 102.

The ramp preview system 100 may augment the displayed composite image to include the virtual ramp 306 to assist a driver with determining an amount of space that is required to deploy the ramp 120 (708). The virtual ramp 306 may be displayed as extending out from the vehicle 102 and/or a virtual representation of the vehicle 102. The dimensions of the virtual ramp 306 may be scaled based on the dimensions of the ramp 120.

The ramp preview system 100 may further determine, via the one or more sensors 118, spatial information of one or more objects within the surrounding area 210 of the vehicle 102 (710). The spatial information may include a height of the one or more objects and/or a distance between the one or more objects and the vehicle 102.

The ramp preview system 100 may augment (or annotate) the displayed composite image to include one or more height annotations 302b and/or one or more distance annotations 304b corresponding to a height of each object of the one or more objects and/or a distance between the each object and the vehicle 102 based on the spatial information (712). The one or more height annotations 302b and/or the one or more distance annotations 304b may be a computer graphics rendering that is overlayed on the displayed composite image and may include a number and/or a unit of measure.

In examples, the ramp preview system 100 may further determine whether the ramp 120 of the vehicle 102 would contact the one or more objects if the ramp 120 was deployed at a current location of the vehicle 102 based on the spatial information of the one or more objects and the ramp parameters stored in the memory 108.

In examples, the ramp preview system 100 may further annotate (or augment) the displayed composite image to include one or more warning annotations 310*b* placed by a respective object of the one or more objects when the ramp preview system 100 determines that the ramp 120 would contact the respective object if the ramp 120 was deployed at the current location of the vehicle 102 and/or when the ramp preview system 100 determines that there would not be enough room between the ramp 120 and the one or more objects for a wheelchair user to use the ramp 120 if the ramp 120 was deployed at the current location of the vehicle 102.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A virtual ramp preview system for a vehicle, the system comprising:

a deployable ramp configured to deploy from the vehicle;

one or more cameras coupled to an exterior of the vehicle and configured to provide one or more fields of view of a surrounding area of the vehicle;

a user interface located within the vehicle and having a display;

one or more distance sensors located on the exterior of the vehicle and configured to detect spatial information of one or more objects within the surrounding area of the vehicle; and an electronic control unit (ECU) electrically connected to the one or more cameras and the user interface and configured to:

display, via the user interface, a composite image of the one or more fields of view, the composite image including a virtual vehicle that is a virtual representation of the vehicle;

augment the composite image to include a virtual ramp extending from the virtual vehicle to assist a driver of the vehicle with determining an amount of space that is required to deploy the deployable ramp; and augment the composite image to include one or more height annotations corresponding to a height of at least one object of the one or more objects based on the detected spatial information.

2. The virtual ramp preview system of claim 1, further comprising a memory configured to store dimensions of the deployable ramp and a deployment location on the vehicle from which the deployable ramp deploys, wherein:

the virtual ramp extends from the virtual vehicle at a location on the virtual vehicle that corresponds to the deployment location on the vehicle, and the virtual ramp is scaled based on the dimensions of the deployable ramp.

3. The virtual ramp preview system of claim 1, wherein the ECU is further configured to:

augment the composite image to include one or more distance annotations corresponding to a distance between the vehicle and each object of the one or more objects based on the detected spatial information.

4. The virtual ramp preview system of claim 3, wherein the ECU is further configured to:

determine whether the distance between the vehicle and the each object is less than a length of the deployable ramp; and augment the composite image by highlighting the each object and/or by including one or more warning annotations when the distance between the vehicle and the each object is less than the length of the deployable ramp.

5. The virtual ramp preview system of claim 1, wherein the ECU is further configured to:

determine whether a height of the each object is greater than a ramp height of the deployable ramp, the ramp height being a distance between a bottom of the deployable ramp and a ground when the deployable ramp is deployed; and augment the composite image by highlighting the each object and/or by including one or more warning annotations when the height of the each object is greater than the ramp height.

6. The virtual ramp preview system of claim 1, wherein:

the composite image includes a panoramic bird's eye viewpoint of the surrounding area of the vehicle; and the virtual vehicle is a virtual representation of a top of the vehicle.

7. The virtual ramp preview system of claim 1, wherein:

the composite image includes a three-dimensional (3D) perspective viewpoint of the surrounding area of the vehicle as viewed from a rear to front direction with respect to the vehicle and from a ground level on a side of the vehicle having the deployable ramp; and the virtual vehicle is a virtual representation of a rear of the vehicle.

8. The virtual ramp preview system of claim 1, wherein:

the composite image includes a three-dimensional (3D) perspective viewpoint of the surrounding area of the vehicle as viewed from a front to rear direction with respect to the vehicle and from a ground level on a side of the vehicle having the deployable ramp; and the virtual vehicle is a virtual representation of a front of the vehicle.

9. The virtual ramp preview system of claim 1, wherein:

the composite image includes a vehicle side viewpoint of the surrounding area of the vehicle as viewed from an outwardly direction with respect to a side of the vehicle having the deployable ramp; and the virtual vehicle is a virtual representation of the side of the vehicle having the deployable ramp.

10. A virtual ramp preview system for a vehicle having a deployable wheelchair ramp, the system comprising:

one or more cameras located on an exterior of the vehicle and configured to provide real-time video data including one or more fields of view of a surrounding area of the vehicle;

a user interface located within the vehicle and having a display; and an electronic control unit (ECU) electrically connected to the one or more cameras and the user interface and configured to:

generate a composite image of the surrounding area of the vehicle based on the one or more fields of view included in the real-time video data, wherein the composite image includes a three-dimensional (3D) perspective viewpoint of the surrounding area of the vehicle as viewed from a rear to front direction with respect to the vehicle and from a ground level on a side of the vehicle having the deployable wheelchair ramp;

augment the composite image to include a virtual ramp extending from a virtual vehicle, the virtual vehicle being a virtual representation of a rear of the vehicle; and display, via the user interface, the augmented composite image.

11. The virtual ramp preview system of claim 10, further comprising a memory configured to store dimensions of the deployable wheelchair ramp and a deployment location on the vehicle from which the deployable wheelchair ramp deploys, wherein:

the virtual ramp extends from the virtual vehicle at a location on the virtual vehicle that corresponds to the deployment location on the vehicle, and the virtual ramp is scaled based on the dimensions of the deployable wheelchair ramp.

12. The virtual ramp preview system of claim 10, further comprising one or more distance sensors located on the exterior of the vehicle and configured to detect spatial information of one or more objects within the surrounding area of the vehicle, wherein the ECU is further configured to:

augment the composite image to include one or more height annotations corresponding to a height of each object of the one or more objects based on the detected spatial information.

13. The virtual ramp preview system of claim 12, wherein the ECU is further configured to:

determine whether the height of the each object is greater than a ramp height of the deployable wheelchair ramp, the ramp height being a distance between a bottom of the deployable wheelchair ramp and a ground when the deployable wheelchair ramp is deployed; and augment the composite image by highlighting the each object and/or by including one or more warning annotations when the height of the each object is greater than the ramp height.

14. The virtual ramp preview system of claim 10, further comprising one or more distance sensors located on the exterior of the vehicle and configured to detect spatial information of one or more objects within the surrounding area of the vehicle, wherein the ECU is further configured to:

augment the composite image to include one or more distance annotations corresponding to a distance between the vehicle and each object of the one or more objects based on the detected spatial information.

15. The virtual ramp preview system of claim 14, wherein the ECU is further configured to:

determine whether the distance between the vehicle and the each object is less than a length of the deployable wheelchair ramp; and augment the composite image by highlighting the each object and/or by including one or more warning annotations when the distance between the vehicle and the each object is less than the length of the deployable wheelchair ramp.

16. A method for providing a virtual ramp preview to a driver of a vehicle having a deployable wheelchair ramp, the method comprising:

generating, via an electronic control unit (ECU), one or more composite images of a surrounding area of the vehicle based on video data from one or more cameras;

detecting, via one or more distance sensors, spatial information of one or more objects within the surrounding area of the vehicle;

displaying, via a user interface coupled to the ECU, a composite image of the one or more composite images;

augmenting, via the ECU, the displayed composite image to include a virtual ramp to assist the driver with estimating an amount of space that is required to deploy the deployable wheelchair ramp; and augmenting the composite image to include one or more height annotations corresponding to a height of at least one object of the one or more objects based on the detected spatial information.

17. The method of claim 16, further comprising:

receiving, via the one or more cameras, the video data including one or more fields of view of the surrounding area of the vehicle.

18. The method of claim 16, further comprising:

augmenting, via the ECU, the displayed composite image to include one or more distance annotations corresponding to a distance between the each object and the vehicle based on the spatial information.

* * * * *